Aug. 9, 1955     A. J. THIEBLOT ET AL     2,714,999
JET-PROPELLED BOMBING AIRCRAFT
Filed April 20, 1949     6 Sheets-Sheet 1
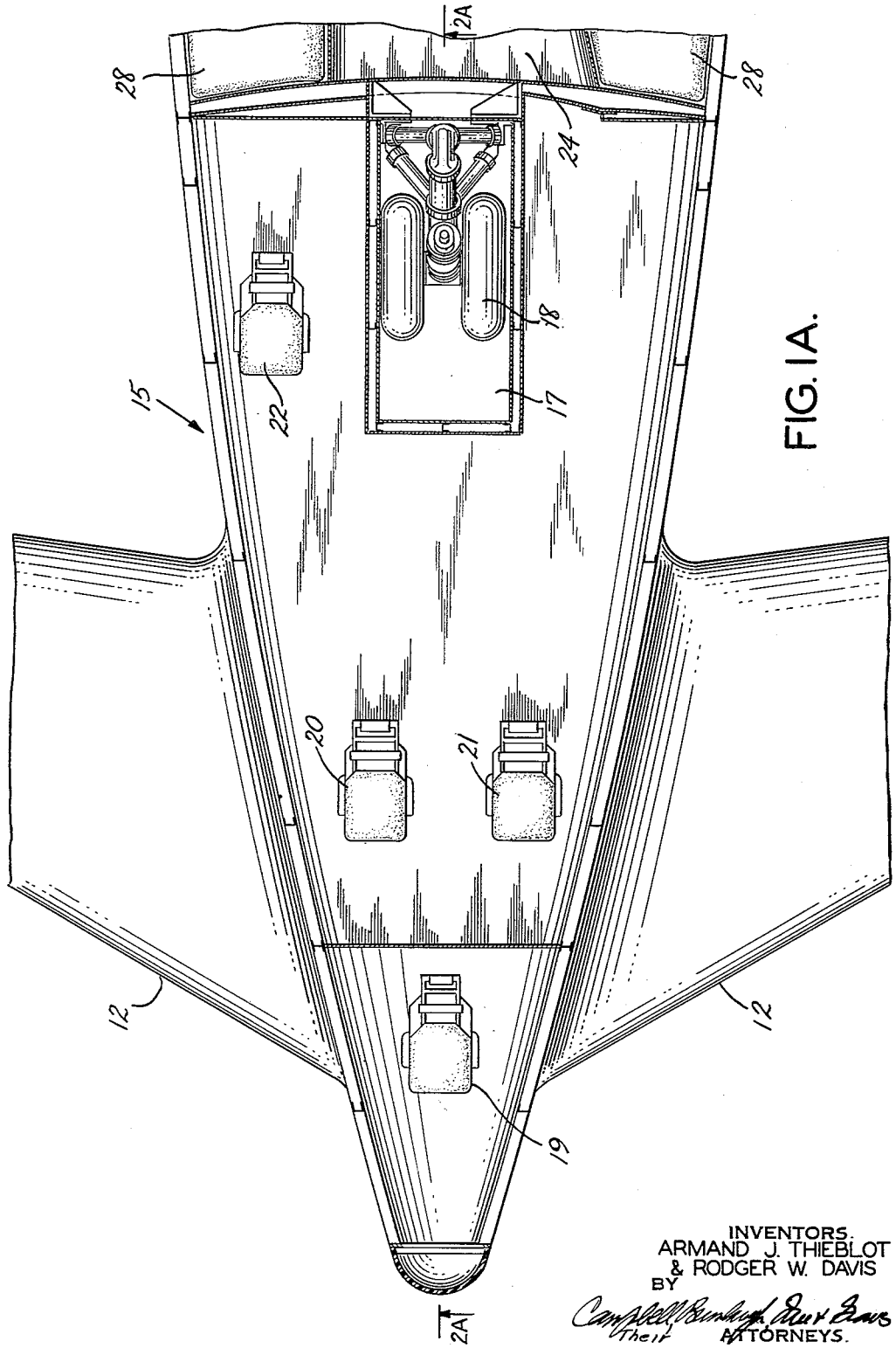
FIG. IA.
INVENTORS.
ARMAND J. THIEBLOT
& RODGER W. DAVIS
BY
*Their* ATTORNEYS.

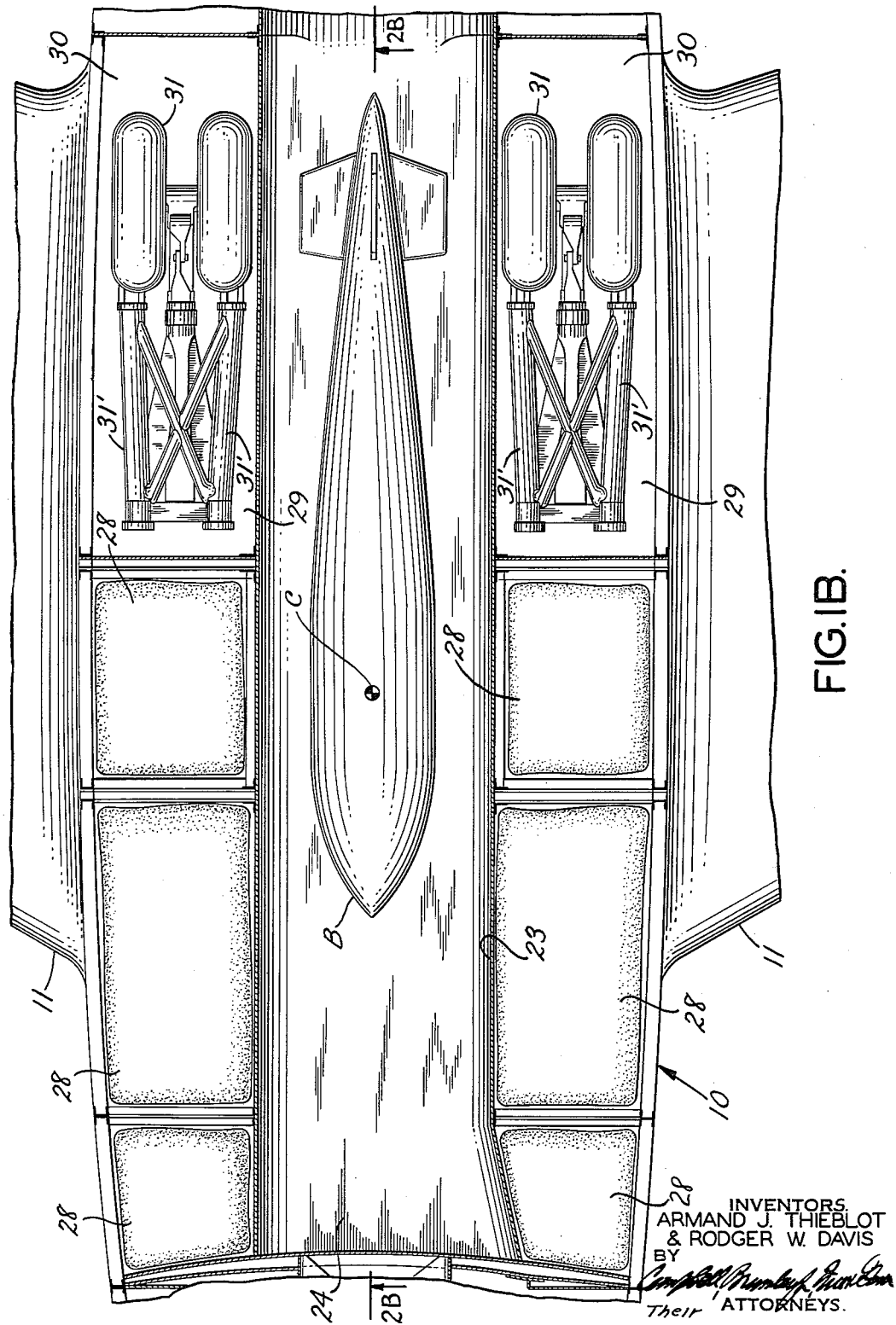

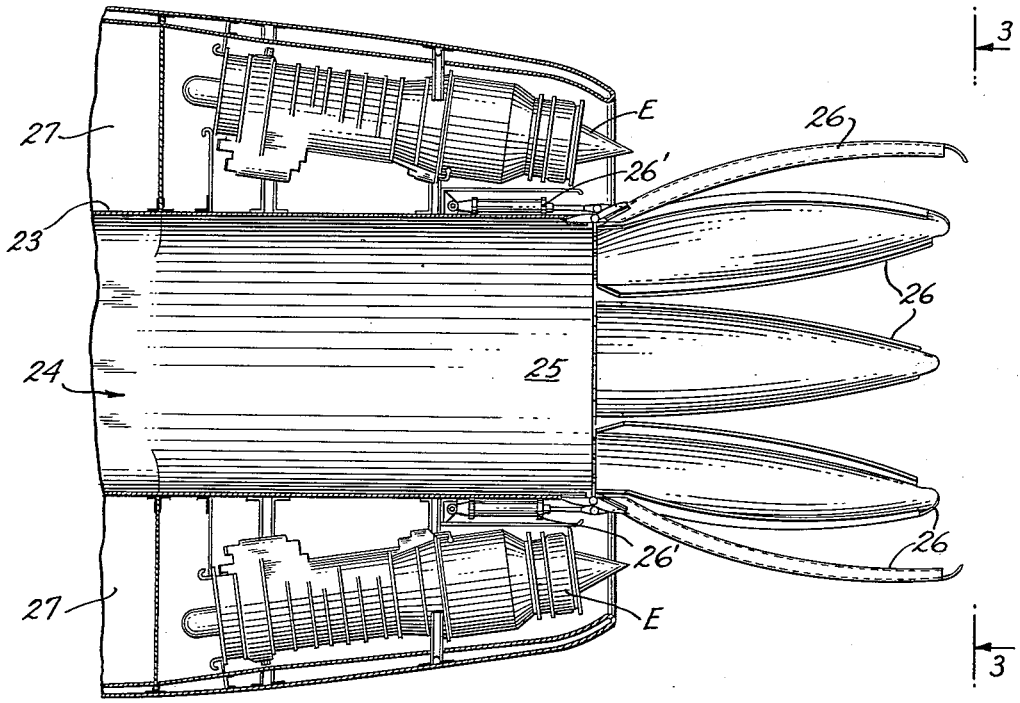
FIG. 2C.
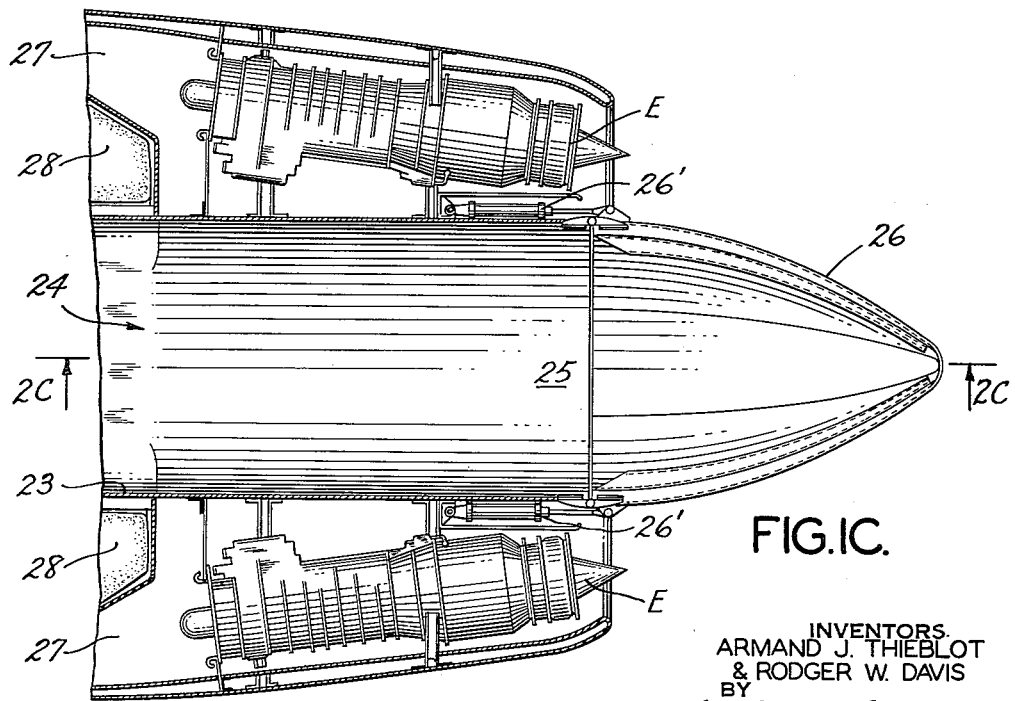
FIG. IC.

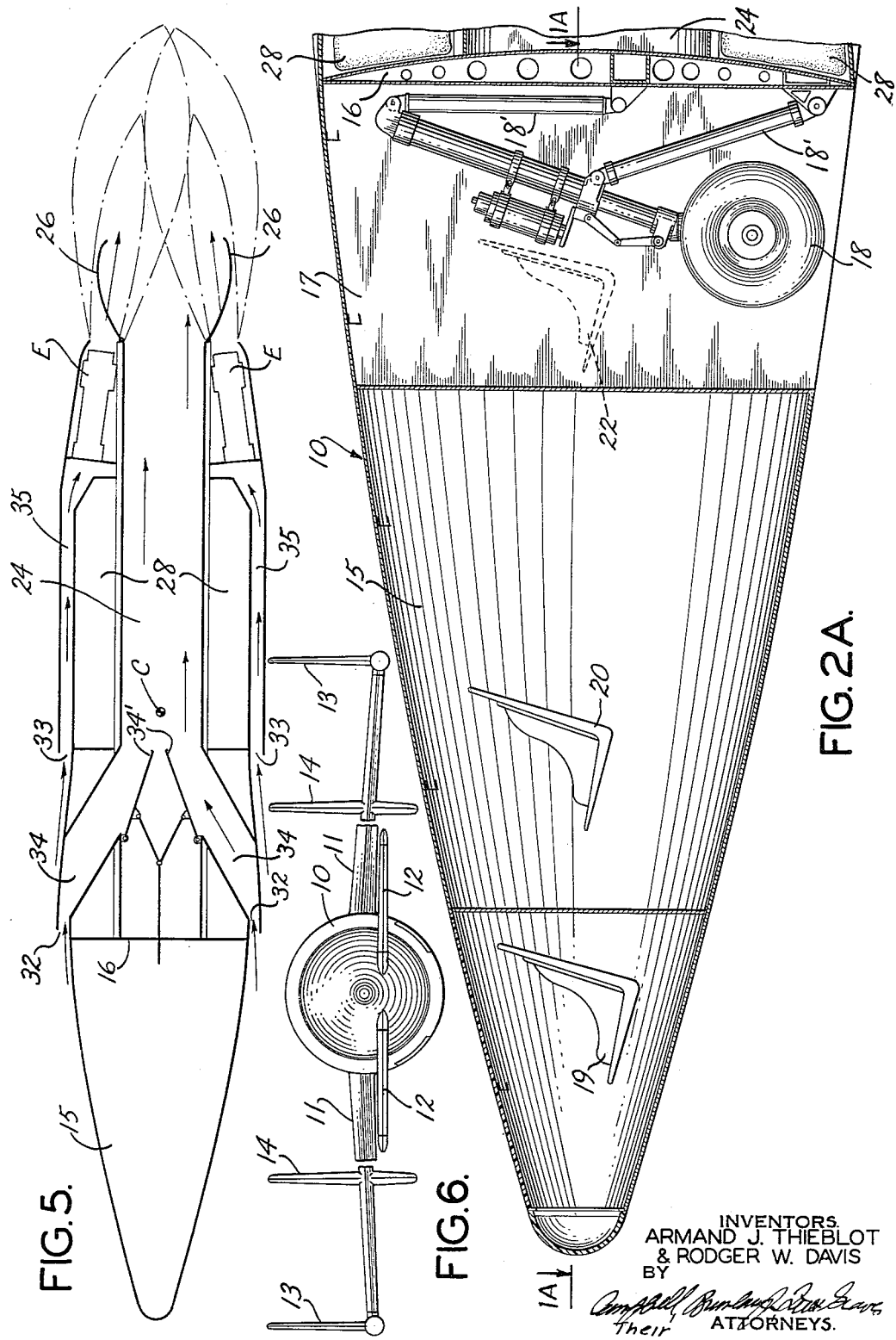

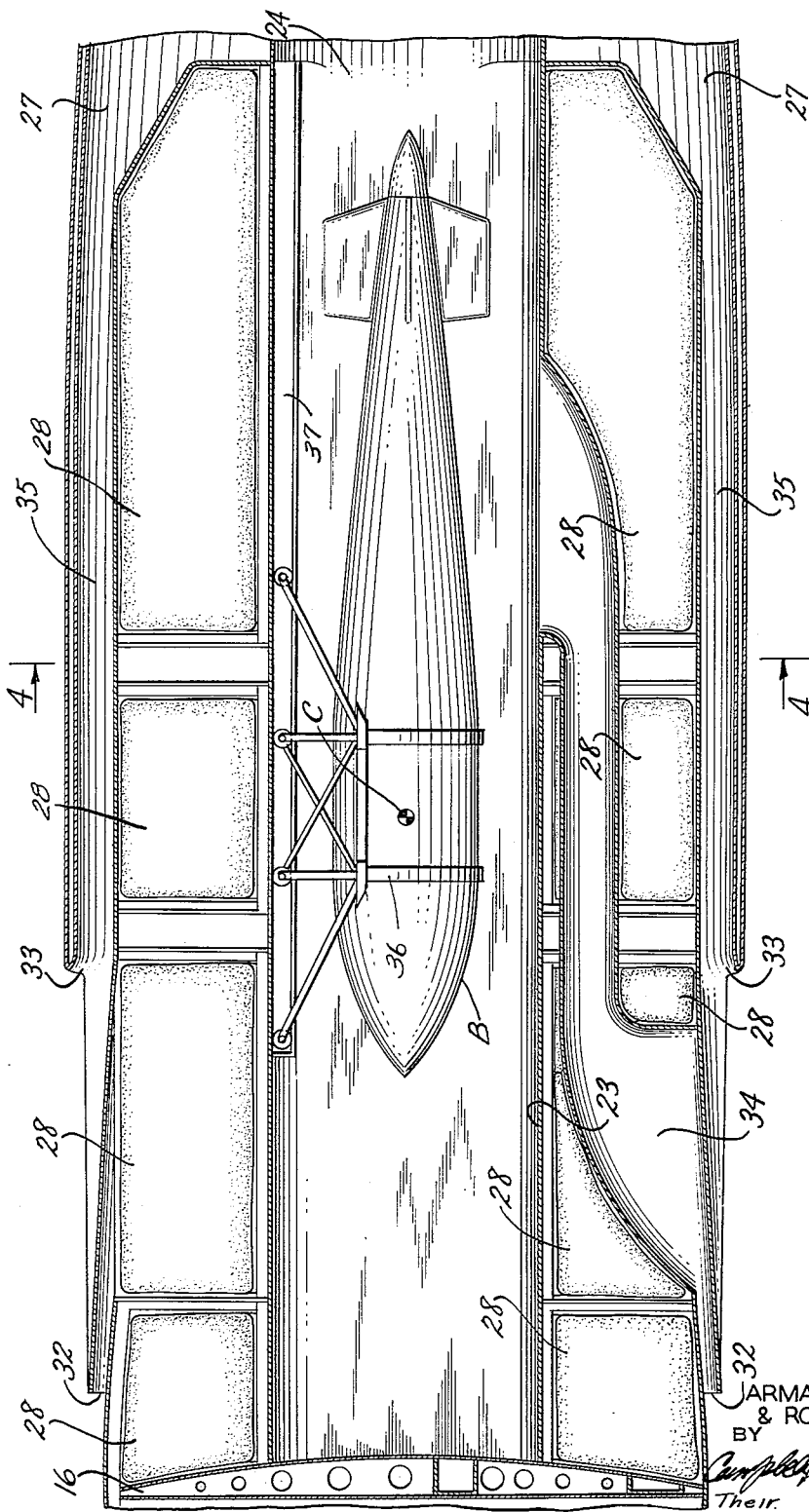

Aug. 9, 1955 A. J. THIEBLOT ET AL 2,714,999
JET-PROPELLED BOMBING AIRCRAFT
Filed April 20, 1949 6 Sheets-Sheet 6

INVENTORS
ARMAND J. THIEBLOT
& RODGER W. DAVIS
BY
Their ATTORNEYS.

United States Patent Office 2,714,999
Patented Aug. 9, 1955

2,714,999

JET PROPELLED BOMBING AIRCRAFT

Armand J. Thieblot and Rodger W. Davis, Hagerstown, Md., assignors to Fairchild Engine and Airplane Corporation, New York, N. Y., a corporation of Maryland Application April 20, 1949, Serial No. 88,621

4 Claims. (Cl. 244—74)

This invention relates to aircraft, and has particular reference to high speed bombing aircraft.

It is well recognized that the trend toward increased weight of bombs, requiring larger aircraft, presents numerous problems. For example, bombs carried by high speed aircraft are necessarily carried inside the aircraft to prevent the drag of exteriorly mounted bombs, but then the high speed slip stream is likely to tear the bomb bay doors from the aircraft when they are opened to discharge the bomb and the effort to correct this condition by the use of unconventional sliding or collapsing doors flush with the fuselage surface still presents a large opening when the bomb is dropped, thereby causing a considerable air drag which dangerously slows the craft over enemy territory. Also, the reverse air flow from the open bomb bay disturbs and impairs the accuracy of the bomb drop to a degree which cannot be tolerated in the desired optimum design. Moreover, even under the best of conditions of current practice, there is always a speed range above which bombs cannot be dropped satisfactorily because the differential speed above a certain ratio results in gyration and tumbling of the bomb when it engages the slip stream, so that bombing accuracy is difficult to achieve and the large differential speed sometimes causes the bomb itself to disintegrate soon after discharge. The desirable condition, therefore, is to discharge a large bomb from a high speed aircraft in such a way that the airplane-bomb speed differential is not so high as to cause the aforementioned difficulties, which requires aircraft of new design and construction, including a bomb discharge arrangement which will accommodate a large bomb without materially increasing the size of the airplane, or disturb the aerodynamic balance, considering that the bomb is discharged at a time of high fuel consumption so that there is a sudden decrease in the disposable load at a critical time.

In accordance with the present invention, a high speed bombing aircraft is provided which is capable of carrying a vary large, heavy and long bomb without material increase in size and under such conditions that the opening of the bomb bay does not disturb the craft aerodynamically, the bomb discharge is not affected by the air stream, and the speed differential between the aircraft and the discharged bomb is not too great to impair the bomb accuracy or effectiveness, while at the same time obtaining and maintaining optimum high speed.

In a preferred embodiment of the invention, the aircraft of this invention is of the canard type and has a fuselage of a shape as nearly approaching a perfect projectile shape as is feasible, a relatively thin, high-speed, tapered, swept mid-wing having a slight amount of cathedral angle, a single horizontal elevating surface mounted at the nose of the fuselage and vertical fins on the wing, one at each wing tip and one inboard therefrom with each fin terminating in a rudder. A group of jet type propulsion engines are mounted at the rear of the circular cross-section fuselage and surround a tubular tunnel-like bomb bay in which is housed the long torpedo or bomb for power discharge through the rear axial opening, torpedo fashion and at a speed substantially equal to the speed of the aircraft, so that there is no airplane-bomb speed differential disturbing the bomb accuracy, thereby enabling bomb discharge at very high speeds, the bomb then dropping virtually vertically.

It will be seen that the high speed bombing aircraft of this invention enables aircraft bombing at highest practical aircraft speed with enhanced bombing accuracy, and that the load disposition around the longitudinal axis, with reference to the center of gravity, enables a large bomb and fuel load without affecting the aerodynamic efficiency or stability of the airplane, even though the disposable bomb and fuel loads simultaneously approach a minimum when the bomb is launched.

For a more complete understanding of the invention, reference may be had to the accompanying drawings, in which:

Figures 1A, 1B and 1C jointly illustrate a horizontal axial section through the fuselage of the airplane of this invention as seen along the lines 1A—1A, 1B—1B and 1C—1C of Figs. 2A, 2B and 2C, respectively;

Figs. 2A, 2B and 2C jointly illustrate a vertical axial section through the fuselage of the airplane of this invention as seen along the lines 2A—2A, 2B—2B and 2C—2C of Figs. 1A, 1B and 1C, respectively;

Fig. 5 is an air flow diagram illustrating the boundary air induction system for supplying bomb bay pressure equalization and the power plant combustion air, and Fig. 6 is a front elevational view of the airplane.

Figure 3:
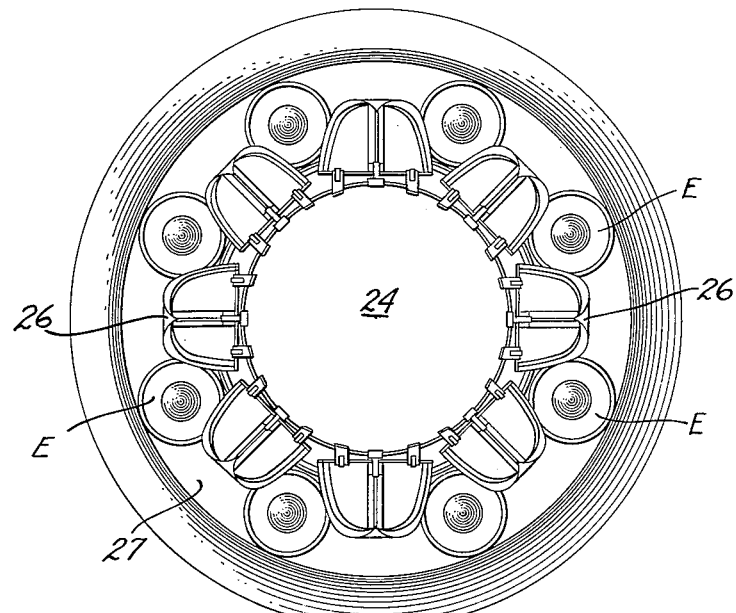
Fig. 3 is a rear end view of the fuselage as seen along the line 3—3 of Fig. 2C, showing the multiple power plant uits arranged concentrically about the axial bomb tunnel.

The drawings illustrate a generally canard type airplane in which fuselage 10 has a virtually perfect projectile shape, provided with a relatively thin tapered mid-wing 11 having a slight cathedral angle, best shown in Fig. 6, and with a simple horizontal elevator 12 mounted near the nose. The wing 11 is provided with vertical fins, the fins 13 being mounted at the wing tips and the fins 14 being mounted inboard therefrom, as shown in Fig. 6, these fins being fitted with rudders operated in the usual way by conventional mechanism, not shown.

Approximately the forward third of the fuselage 10, as shown particularly in Figs. 1A, 2A and 5, serves as the crew compartment 15 which is separated from the remainder of the fuselage by a transverse bulkhead 16, and which may be interrupted by the well 17 housing the extensible landing nose wheel 18. The crew compartment 15 is fitted with the pilot's seat 19, navigator's and bombardier's seat 20, co-pilot and radio operator's seat 21, engineer's seat 22 and the usual flight, observation, communication and other instruments and equipment, all constituting part of the fixed load.

Extending rearwardly from transverse bulkhead 16 for the remaining approximate two-thirds of the fuselage 10 and coaxially therewith, is a square tube 23 forming the fore-and-aft bomb bay or bomb tunnel 24, whose rear opening 25 may be normally closed by a suitable closure, such as the "orange peel" doors 26, shown open in Fig. 2C and closed in Fig. 1C, each segment of which is connected to a power cylinder 26' operated from the crew compartment 15.

Figure 4:
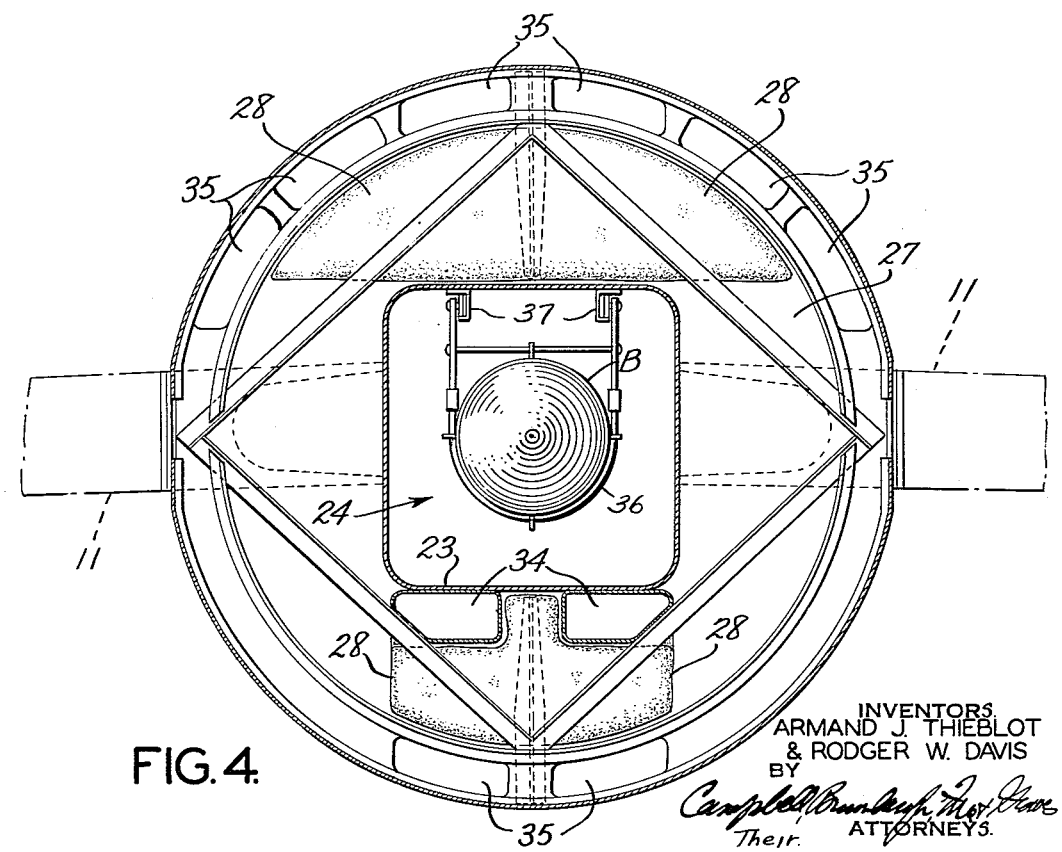
Fig. 4 is a transverse section through the fuselage as seen along the line 4—4 of Fig. 2B, showing the symmetrical disposition of the fuel tanks and the bomb bay pressure equalizing ducts and engine air intakes.

Mounted coaxially in the bomb tunnel 24 with its center of gravity C located at the airplane center of gravity, which preferably lies between the front and rear spars of wing 11, is a bomb B, either suspended in a cradle 36 running on rails 37 as shown in Figs. 2B and 4, or in a torpedo tube, or otherwise in a mobile fashion for power discharge rearwardly in a manner forming no part of the present invention, but disclosed in detail in copending application Serial No. 88,622, filed April 20, 1949.

Positioned at the rear of the annular space 27 formed between the wall of the fuselage 10 and the circular end of tube 23 is a circular series of combustion gas reaction or jet type engines E of conventional design, such as Westinghouse model 24C, for example. There may be eight of such engines E, more or less, provided that they are symmetrically arranged for uniform thrust distribution about the axis of the fuselage 10 as shown in Figs. 3 and 5. Also as there shown, the axes of engines E converge rearwardly so that their jets converge on the axis of the fuselage in general conformance with the characteristic boundary air flow behind a blunt-tail projectile.

Distributed symmetrically about the vertical axis in virtually the remainder of annular space 27 are independent fuel tanks 28, shown in Figs. 1B, 4 and 5. The fore-and-aft distribution of the fuel tanks also is symmetrical about the center of gravity of the airplane, as shown in Fig. 2B, and the fuel will be drawn ballast-fashion from the tanks 28 so that the trim of the airplane will not be affected as the fuel is consumed. It will be understood that the lubricating oil load is similarly distributed and that wing tanks will be provided between the spars of wings 11 and so distributed and used to maintain trim.

The fixed flight load of crew and equipment in the crew compartment 15 forward, and the fixed load of power plant engines E aft, are balanced about the center of gravity of the craft at all times and, with the fuel and oil distributed about the center of gravity and expended to maintain trim in the manner described, the sudden change in the disposable load occasioned by the discharge of heavy bomb B will not alter trim or balance between maximum full load condition with full fuel and bomb load and the minimum load condition with no load and low fuel.

Also occupying a portion of the annular space 27 in the fuselage 10 are the wells 30 in which the main retractable landing gear 31 is housed. Preferably, the landing gear 18, 31 is made light of weight for use only in landing, when the load is light. Takeoff may be effected by a catapult or by means of a powered dolly which is jettisoned upon takeoff, whereby a considerable proportion of gross landing gear load is saved. The landing gear 18, 31 is extended prior to landing by conventional means, such as the hydraulic power cylinders 18' and 31' actuated from the crew compartment 15.

As shown particularly in Figs. 2B and 5, forwardly-directed, shallow but circumferentially long air scoops 32 extend slightly above the skin surface of the fuselage 10 for collecting a portion of the boundary air layer moving at a relatively high speed over the skin surface of the fuselage. Scoops 32 communicate with one or more ducts 34 leading to the interior of the bomb tunnel 24, preferably entering the latter at a point at or just ahead of the nose of the bomb B, so that a ram jet effect is obtained at high speed augmenting bomb discharge when rear door 26 is opened at that instant or when alternative flaps 34' normally closing the duct 34 are opened, or both, by means shown in said copending application. Also, the air entering the bomb tunnel 24 from scoops 32 flushes products of combustion therefrom after bomb discharge in cases where explosive or rocket expulsion of the bomb is utilized.

The rear scoops 33 communicate with longitudinal ducts 35 extending through the annular space 27 to the engines E for supplying them with combustion-supporting air under pressure for more complete fuel combustion, thereby adding to the thrust. These ducts 35 are distributed circumferentially around the annular space 27 as shown especially in Fig. 4. The scoops 32 or 33, or both, may be enlarged to obtain a greater pressure of rammed air for ram jet effect at very high airplane speed.

Instead of impairing the efficiency of the engines E, the segments of the orange peel door 26 when open as shown in Figs. 2C, 3 and 5 as might be supposed, the certain amount of deflection of the jet stream that is produced by the door segments in open position actually increases jet efficiency, particularly at high airplane speeds.

In preparing the airplane of this invention for a bombing mission, the fuel and oil tanks 28 are filled and, being distributed about the center of gravity laterally and longitudinally, the fuel and oil as a large part of the disposable load does not shift the center of gravity of the aircraft. Likewise, the fixed load of engines E aft, and crew and equipment in compartment 15 forward, counterbalance each other about the center of gravity C. By utilizing fuel from tanks 28, in such a way and according to known practice, equally from tanks on opposite sides of the center of gravity, the center of gravity does not shift and the trim of the craft in flight is not affected.

The bomb B or other projectile is positioned by cradle 36 on rails 37 within tunnel 24, coaxially therewith, with the center of gravity of the bomb B coincident with the center of gravity of the airplane, so that it acts as a fixed load until ejected.

As stated, it is preferred that the airplane be launched by catapault or from a powered dolly, so as to conserve fuel and make unnecessary heavy air-borne takeoff gear. After becoming airborne, the best rate of climb would be held until cruising altitude is reached, say 25,000 feet. This altitude would be maintained for a maximum distance of say, 3500 miles, at a speed of say, 550 miles per hour. At this elevation and speed the engine operation, aided by the boundary air entering scoops 33, would be economical as to fuel consumption. The last 500 miles to the target would be flown at low level at say, 550 miles per hour, the bomb ejected over the target, and after the next 500 miles, flown at the same speed, part, say half, of the engines E would be cut out and the remainder of the return trip, with light and decreasinug load, carried out on reserve fuel. Landing on the light gear 18, 31 would be possible since virtually only fixed load remains at completion of the mission.

Ejection of the bomb B does not materially affect the trim of the airplane, since their centers of gravity are coincident. Also, being ejected coaxially with the fuselage into the core of the slip and jet streams, as indicated in Fig. 5, the bomb is not deflected by air streams even at high speed, especially since it is desirable to eject it at the speed of flight of the airplane as is explained in greater detail in said copending application.

The opening of the door 26, if used, is such that the segments thereof do not extend a substantial distance into the slip stream, and to the extent that they do, the extension is symmetrical, so that the door segments are not injured and the air streams are not deflected so as to disturb the airplane flight, nor does the slip stream enter the open end of the tunnel 24 to disturb the flight of the projectile.

Although a preferred embodiment of the invention has been illustrated and described herein, the invention is not limited thereby except to the extent defined by the appended claims.

We claim:
1. In an airplane having a substantially cylindrical fuselage and supporting and orienting surfaces, the combination of a tube mounted coaxially with said fuselage with its rear end terminating at the rear end of said fuselage, said tube having a substantially smaller diameter than said fuselage to provide an annular space between the outer wall of said tube and the inner wall of said fuse- lage, a plurality of combustion gas reaction engines arranged in circular series within said annular space adjacent the rear end of said fuselage for propelling the airplane, and fuel containing means arranged within said annular space forwardly of said engines for supplying the latter with fuel.

2. In an airplane having a substantially cylindrical fuselage and supporting and orienting surfaces, the combination of a tube mounted coaxially with said fuselage with its rear end terminating at the rear end of said fuselage, said tube having a substantially smaller diameter than said fuselage to provide an annular space between the outer wall of said tube and the inner wall of said fuselage, a plurality of combustion gas reaction engines arranged in circular series within said annular space adjacent the rear end of said fuselage for propelling the airplane, and fuel containing means arranged circularly within said annular space forwardly of said engines and distributed laterally about the center of gravity of the airplane for supplying the latter with fuel during flight without material change in the trim of the airplane.

3. In an airplane having a substantially cylindrical fuselage and supporting and orienting surfaces, the combination of a tube mounted coaxially with said fuselage with its rear end terminating at the rear end of said fuselage, said tube having a substantially smaller diameter than said fuselage to provide an annular space between the outer wall of said tube and the inner wall of said fuselage, a plurality of combustion gas reaction engines arranged in circular series within said annular space adjacent the rear end of said fuselage for propelling the airplane, fuel containing means arranged circularly within said annular space forwardly of said engines and distributed laterally about the center of gravity of the airplane, and means mounted in said tube for normally positioning a jettison cargo unit within said tube with its center of gravity located substantially coincidentally with the center of gravity of the airplane, whereby the disposable load of jettison cargo unit and fuel may be selectively disposed of in flight without material change in the trim of the airplane.

4. In an airplane having a substantially cylindrical fuselage and supporting and orienting surfaces, the combination of a tube mounted coaxially with said fuselage with its rear end terminating at the rear end of said fuselage, said tube having a substantially smaller diameter than said fuselage to provide an annular space between the outer wall of said tube and the inner wall of said fuselage, a plurality of combustion gas reaction engines arranged in circular series within said annular space adjacent the rear end of said fuselage for propelling the airplane, a transverse wall in said fuselage toward the nose thereof forming a forward compartment for containing personnel and equipment of predetermined fixed weight substantially counterbalancing the fixed weight of said engines about the center of gravity of the airplane in flight, fuel containing means arranged circularly within said annular space forwardly of said engines and distributed laterally about the center of gravity of the airplane, and means mounted in said tube for normally positioning a jettison cargo unit within said tube with its center of gravity located substantially coincidentally with the center of gravity of the airplane, whereby the disposable load of cargo unit and fuel may be selectively disposed of in flight without material change in the trim of the airplane.

References Cited in the file of this patent

UNITED STATES PATENTS

| | | |
|---|---|---|
| 1,627,968 | Hammer | May 10, 1927 |
| 2,356,674 | Kimmel | Aug. 22, 1944 |
| 2,398,391 | Orkin | Apr. 16, 1946 |
| 2,427,845 | Forsyth | Sept. 23, 1947 |
| 2,456,284 | Jordan | Dec. 14, 1948 |
| 2,479,746 | I'Anson | Aug. 23, 1949 |
| 2,470,120 | Walker | May 27, 1949 |
| 2,483,027 | Van Zelm et al. | Sept. 27, 1949 |
| 2,498,819 | Noville | Feb. 28, 1950 |
| 2,557,522 | Vautier | June 19, 1951 |

FOREIGN PATENTS

| | | |
|---|---|---|
| 328,847 | Italy | Aug. 22, 1935 |
| 467,989 | Great Britain | June 28, 1937 |